June 19, 1962 — M. F. UMSTEAD — 3,039,219
SIMULATED BIRD LAWN MOBILE
Filed April 14, 1960
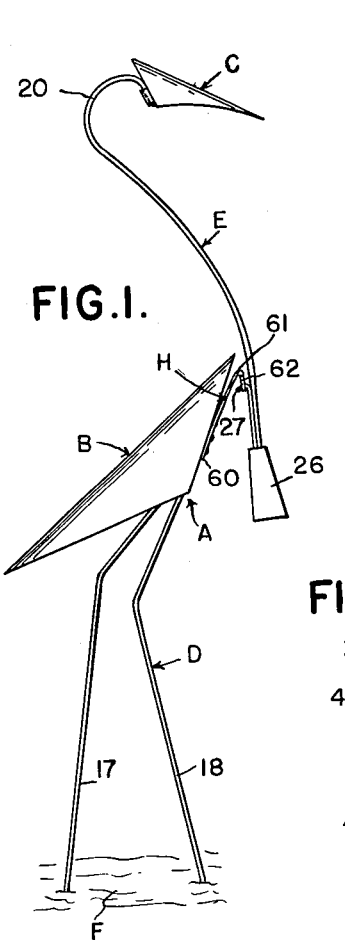
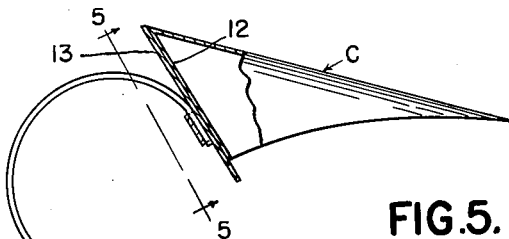
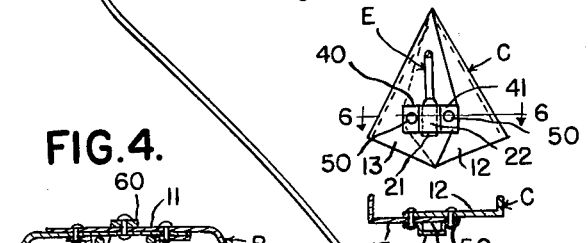
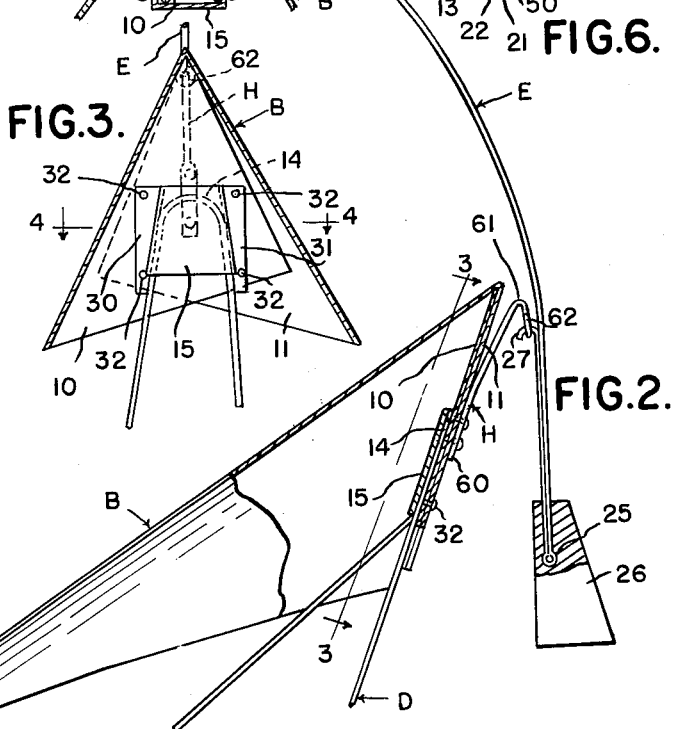
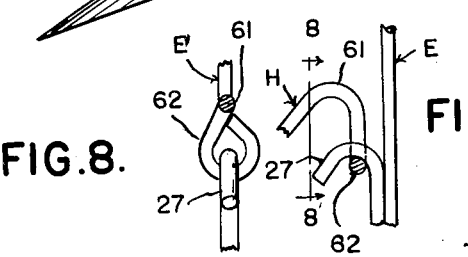
INVENTOR.
MARVIN F. UMSTEAD
BY
Whittemore, Hulbert & Belknap
ATTORNEYS

United States Patent Office 3,039,219
Patented June 19, 1962

3,039,219
SIMULATED BIRD LAWN MOBILE
Marvin F. Umstead, 18204 Parkside Ave., Detroit, Mich.
Filed Apr. 14, 1960, Ser. No. 22,329
4 Claims. (Cl. 41—10)

This invention relates generally to decorative devices known as lawn mobiles, and refers more particularly to a mechanical device simulating a bird such as a crane, flamingo and the like.

One of the essential objects of the invention is to provide an all-metal lawn mobile constituting a unique decoration for installation in a lawn, in a garden, or beside a pool, or in any other area where such decorations may be desired.

Another object is to provide a portable lawn mobile constituting a modern sculptured design, and capable of being provided with a weatherproof baked-on finish in any of various desired colors.

Another object is to provide a lawn mobile wherein the parts respectively simulating the head and body of the bird are each formed from sheet metal, and the parts respectively simulating the legs and neck of the bird are each formed from rod or wire stock.

Another object is to provide a lawn mobile wherein the part simulating the legs has at its upper end an open return bent portion adapted to be detachably interlocked with a keeper therefor carried by the sheet metal part forming the body of the bird, and has at its lower end spaced portions adapted to be inserted into the ground to support the lawn mobile in an upright position.

Another object is to provide a lawn mobile wherein the part simulating the neck of the bird has at its upper end a portion adapted to be detachably interlocked with a keeper therefor carried by the sheet metal part forming the head of the bird.

Another object is to provide a lawn mobile wherein the part simulating the neck of the bird has at its lower end a portion secured to a counterweight, and has in spaced relation to said counterweight a hook adapted to be detachably connected to a support therefor fixed to the metal part forming the body of the bird.

Another object is to provide a lawn mobile wherein the detachable connection between the hook and support therefor includes an eye fixed to said support and loosely and freely receiving the hook, whereby the connected parts respectively simulating the neck and head of the bird, as well as said counterweight, may swing freely as a unit in the breeze relative to the part simulating the body of the bird, and said counterweight may return said parts automatically to an upright position when not actuated by a breeze.

Another object is to provide a lawn mobile wherein a common means is employed to secure the support aforesaid to the part simulating the body of the bird and to secure together overlapping portions of said part simulating the body of the bird.

Another object is to provide a lawn mobile wherein a common means is employed to secure to the part simulating the head of the bird the keeper aforesaid for the part simulating the neck of the bird, and to secure together overlapping portions of said part simulating the head of the bird.

Another object is to provide a collapsible lawn mobile that may be shipped in knocked-down condition in a relatively small compact container, and that may be easily and quickly assembled by an unskilled person without the aid of separate fasteners or tools.

Another object is to provide a lawn mobile that is simple in construction, economical to manufacture, and appealing to the eye of an observer.

Other objects, advantages and novel details of construction of this invention will be made more apparent as this description proceeds, especially when considered in connection with the accompanying drawing wherein:

FIGURE 1 is a side elevational view of a decorative device embodying my invention.

FIGURE 2 is an enlarged fragmentary side elevational view of the device illustrated in FIGURE 1, with parts broken away and in section.

FIGURE 3 is a substantially vertical sectional view taken on the line 3—3 of FIGURE 2.

FIGURE 4 is a horizontal sectional view taken on the line 4—4 of FIGURE 3.

FIGURE 5 is a sectional view taken on the line 5—5 of FIGURE 2.

FIGURE 6 is a sectional view taken on the line 6—6 of FIGURE 5.

FIGURE 7 is an enlarged fragmentary elevational view through the hook and eye connection between the neck part E and the support member H.

FIGURE 8 is a sectional view taken substantially on the line 8—8 of FIGURE 7.

In the drawing, A is a lawn mobile embodying my invention and simulating a bird such as a crane or a flamingo.

As shown, B and C respectively are sheet metal parts, preferably of aluminum, simulating the body and the head of the bird, and D and E respectively are parts formed from rod or wire stock and simulating the legs and the neck of the bird.

Preferably the part B simulating the body of the bird is an elongated longitudinally tapered substantially trough-shaped member having at the wider forward end thereof two substantially flat portions 10 and 11 respectively folded inwardly from opposite longitudinal side edges thereof along rearwardly diverging lines and arranged in overlapping relation with each other and in spanning relation to the open side of the trough. Thus such part B has a closed substantially pointed forward end, and has a relatively shallow narrower rear end.

The part C simulating the head of the bird is also an elongated longitudinally tapered substantially trough-shaped member, but is disposed in reversed position relative to and is much smaller than the part B simulating the body of the bird. Such head part C also has at the wider rear end thereof two substantially flat portions 12 and 13 respectively folded inwardly from opposite longitudinal side edges thereof along forwardly diverging lines and arranged in overlapping relation with each other and in spanning relation to the open side of the trough.

The part D simulating the legs of the bird has at its upper end an upwardly tapering open return bent portion 14 adapted to be detachably interlocked with a keeper 15 therefor upon the inner side of and carried by the overlapping portions 10 and 11 of the part B forming the body of the bird, and has at its lower end spaced portions 17 and 18 respectively disposed in offset relation to each other in a walking stance and constituting downward extensions of opposite sides of said open return bent portion 14. Such spaced portions 17 and 18 have free lower ends adapted to be inserted into the ground F to support the lawn mobile in an upright position.

The part E simulating the neck of the bird is a longitudinally curved member having at its upper end an open return bent portion 20 terminating in a flattened free end portion 21 (FIGURE 5) adapted to be detachably interlocked with a keeper 22 therefor upon the outer side of and carried by the overlapping portions 12 and 13 of the part C forming the head of the bird. Such part E is provided at its lower end with a return bent portion 25 secured to an elongated counterweight 26 for the head part C.

The neck part E is also provided in spaced relation to the counterweight 26 with a laterally projecting downwardly opening hook 27 adapted to be detachably connected to a support H therefor carried by the overlapping portions 10 and 11 of the part B forming the body of the bird.

Preferably the keeper 15 for the open return bent portion 14 of the leg part D comprises an upwardly tapering channel-shaped member, preferably of sheet metal, opening toward the flat portions 10 and 11 of the body part B, and having along opposite longitudinal side edges thereof laterally extending flanges 30 and 31 that are secured to the flat portions 10 and 11 by rivets 32 or the like that extend through and fasten together the flat portions 10 and 11. Thus the rivets 32 constitute a common means for attaching the keeper 15 to the flat portions 10 and 11 and for attaching said flat portions 10 and 11 to each other.

The keeper 22 for the flattened free end portion 21 of the neck part E comprises a channel-shaped member, preferably of sheet metal, opening toward the flat portions 12 and 13 of the head part C and having along opposite longitudinal side edges thereof laterally extending flanges 40 and 41 that are secured to the flat portions 12 and 13 by rivets 50 or the like that extend through and fasten together the flat portions 12 and 13. Thus these rivets 50 constitute a common means for attaching the keeper 22 to the flat portions 12 and 13 and for attaching said flat portions 12 and 13 to each other.

The support H for the hook 27 comprises a short straight rod or length of wire having a flattened end portion 60 secured to the flat portions 10 and 11 of the body part B and having an open return bent free end 61 provided with a closed circular eye 62 for the reception of the hook 27. Such support H may be located either upon the outer side of the overlapping portions 10 and 11 as shown, or may be located upon the inner side of said overlapping portions 10 and 11, with a part of said open return bent free end 61 extending outwardly through registering openings in said overlapping portions.

Preferably the eye 62 is spaced outwardly from the pointed forward end of the body part B so that the counterweight 26 may swing freely relative to the body part B. Also, the inside diameter of the closed circular eye 62 is larger than the outside diameter of the hook 27 so that the latter is loosely and freely received in the eye. Thus the counterweight 26, neck part E, and head part C may swing freely as a unit in the breeze relative to the body part B.

Inasmuch as detachable connections are provided as described, between the various parts D, B, E and C respectively of the device, it is apparent that such parts may be shipped in knocked-down or collapsed condition in a relatively small compact container (not shown), and may be easily and quickly assembled by an unskilled person when it is desired to install the device in a lawn or in a garden or beside a pool or in any other area where such a decoration is desired. Such installation may be readily made by merely inserting the lower free ends of the legs 17 and 18 of the device into the ground or into wet cement, as desired.

What I claim as my invention is:

1. A detachable device simulating a bird, comprising one part formed from sheet stock and simulating the body of the bird, a second part formed from wire stock detachably connected to said one part and extending downwardly therefrom to simulate the legs of the bird, a third generally upright part formed from wire stock and simulating the neck of the bird, a fourth part formed from sheet stock detachably connected to the upper end of said third part and simulating the head of the bird, a counterweight carried by said third part at the lower end thereof, and means providing a detachable, articulated, swinging connection between said third part and said one part operable to permit said third and fourth parts to swing freely as a unit in the breeze relative to said one part, said means including a hook on said third part intermediate said counterweight and said fourth part and an eye on said one part in outwardly offset relation thereto, said hook being loosely received in and suspended from said eye for swinging movement.

2. The device defined in claim 1 wherein said one one part and said fourth part each is an elongated, longitudinally tapered, substantially trough-shaped member of gradually decreasing depth from the wider end thereof to the other end thereof, each of said substantially trough-shaped members having at the wider end thereof two substantially flat portions folded inwardly from opposite longitudinal side edges thereof along diverging lines and secured together in overlapping surface-to-surface relation with each other in spanning relation to the open side of the trough.

3. The device defined in claim 2 wherein said substantially trough-shaped member forming said one part is provided with a keeper secured to the folded substantially flat portions thereof, said second part has at its upper end an open return bent portion detachably interlocked with said keeper, and common means are provided for securing together said folded portions of said member forming said one part and for securing said keeper to the folded portions thereof.

4. The device defined in claim 2 wherein said substantially trough-shaped member forming said fourth part is provided with a keeper secured to the folded substantially flat portions thereof, said third part has at its upper end a portion detachably interlocked with said keeper, and common means are provided for securing together said folded portions of said member forming said fourth part and for securing said keeper to the folded portions thereof.

References Cited in the file of this patent
UNITED STATES PATENTS

| | | |
|---|---|---|
| 1,441,164 | Murray | Jan. 2, 1923 |
| 2,027,981 | Jensen | Jan. 14, 1936 |
| 2,622,366 | Abplanalp | Dec. 23, 1952 |